(12) United States Patent
Shiozaki et al.

(10) Patent No.: US 11,082,253 B2
(45) Date of Patent: Aug. 3, 2021

(54) COMMUNICATION SYSTEM

(71) Applicant: Yazaki Corporation, Tokyo (JP)

(72) Inventors: Tomohiro Shiozaki, Susono (JP); Yoshihide Nakamura, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 57 days.

(21) Appl. No.: 16/559,857

(22) Filed: Sep. 4, 2019

(65) Prior Publication Data
US 2020/0127870 A1 Apr. 23, 2020

(30) Foreign Application Priority Data

Oct. 18, 2018 (JP) .............................. JP2018-196432

(51) Int. Cl.
*H04L 12/40* (2006.01)
(52) U.S. Cl.
CPC .. *H04L 12/40019* (2013.01); *H04L 12/40032* (2013.01); *H04L 12/40045* (2013.01); *H04L 2012/40273* (2013.01)
(58) Field of Classification Search
CPC ......... H04L 12/40019; H04L 12/40032; H04L 12/40045
See application file for complete search history.

(56) References Cited

U.S. PATENT DOCUMENTS

| 5,305,316 | A | * | 4/1994 | Yoshida | .............. | B60R 16/0315 |
| | | | | | | 340/310.11 |
| 9,256,260 | B2 | | 2/2016 | Hatta | | |
| 9,804,658 | B2 | | 10/2017 | Asano et al. | | |
| 2004/0003153 | A1 | * | 1/2004 | Froeschl | ............. | H04L 12/4035 |
| | | | | | | 710/104 |
| 2006/0020372 | A1 | * | 1/2006 | Watabe | ................... | H04L 43/10 |
| | | | | | | 701/1 |
| 2007/0233919 | A1 | * | 10/2007 | Miura | ................. | H04L 12/4135 |
| | | | | | | 710/110 |
| 2014/0310442 | A1 | | 10/2014 | Kimura et al. | | |
| 2016/0277208 | A1 | * | 9/2016 | Petrucci | ............ | H04L 12/40013 |
| 2020/0127868 | A1 | * | 4/2020 | Nakamura | ............ | H04L 12/403 |

FOREIGN PATENT DOCUMENTS

| EP | 1600315 A1 | 11/2005 |
| JP | 2008-310389 A | 12/2008 |
| JP | 2010-136452 A | 6/2010 |
| JP | 2011-138468 A | 7/2011 |
| WO | 2012018033 A1 | 2/2012 |

* cited by examiner

*Primary Examiner* — Jeffrey M Rutkowski
*Assistant Examiner* — Basil Ma
(74) *Attorney, Agent, or Firm* — Sughrue Mion, PLLC

(57) ABSTRACT

Provided is a communication system capable of performing function addition and design change inexpensively. The communication system includes a plurality of slave devices and a master device communicating with the plurality of slave devices. The control blocks control the slave devices or the master device. The input blocks input the input signals to input ports of the control blocks, respectively. The output blocks include semiconductor relays that are turned on and off according to output signals output from the output ports of the control blocks, respectively. The power supply block supplies power to the control blocks. These blocks are configured on separate substrates. The communication block has a communication I/F circuit. The slave devices or the master device are configured by combining plural types of blocks.

1 Claim, 7 Drawing Sheets

COMMUNICATION SYSTEM

TECHNICAL FIELD

The present invention relates to a communications system.

BACKGROUND ART

Vehicles such as passenger cars and freight cars are equipped with various loads such as lamps and power windows. Then, there has been proposed a technique of controlling the loads using communication between a plurality of slave devices to which a plurality of loads is connected and a master device controlling the plurality of slave devices.

In the above-described master device and slave devices, when a function addition or a design change occurs, it is necessary to replace the entire master device and slave devices, which causes a problem in cost.

Further, Patent Literature 1 proposes an integrated circuit in which blocks having different functions are provided in a circuit layer, and a wiring layer for wiring the blocks is provided on the upper side of the circuit layer. This integrated circuit also needs to replace the entire circuit layer if a function addition occurs in the circuit layer.

PRIOR ART DOCUMENT

Patent Literature

Patent Literature 1: JP 2010-136452 A

SUMMARY OF INVENTION

Technical Problem

The present invention has been made in view of the above background, and it is an object of the present invention to provide a communication system capable of performing function addition and design change inexpensively.

Solution to Problem

According to a first aspect of the present invention, there is provided a communication system including:
a plurality of slave devices;
a master device communicating with the plurality of slave devices; and
a plurality of types of circuit blocks, each with different functions and formed on separate substrates,
wherein the slave devices and the master device are configured by combining the plurality of types of circuit blocks.

Preferably, the circuit blocks include:
a control block for controlling the slave devices or the master device;
an input block connected to an input port of the control block for inputting an input signal to the input port; and
an output block having an output switch connected to an output port of the control block and turned on and off according to an output signal.

Preferably, the circuit blocks further include:
a power supply block for supplying power to the control block; and
a communication block having a communication interface.

Preferably, the communication system further includes:
a writing device for writing an ID to the slave devices and the master device,
wherein after transmitting the ID of the master device, the writing device sequentially transmits the IDs of the plurality of slave devices,
wherein the master device includes:
a plurality of output switches provided for each of the plurality of slave devices and for supplying power to the corresponding slave devices;
a first setting unit that receives the ID of the master device from the writing device and sets it as its own ID; and
a switch control unit that turns on the output switch in order each time the ID of the plurality of slave devices is received from the writing device after setting its own ID, and
wherein the plurality of slave devices has a second setting unit that sets the ID received after power supply as its own ID.

Preferably, the master device is installed in a vehicle, the plurality of slave devices is connected to a plurality of loads, the plurality of loads is classified into a load that can be driven at all times, a load that can be driven at accessory time, and a load that can be driven at ignition time, and the same type of load is connected to one of the slave devices.

Preferably, a plurality of the master devices is installed in a vehicle, and the ID of the master device includes installation information indicating the installation position of the master device in the vehicle.

Effect of the Invention

As described above, according to the aspect, the slave devices and the master device are configured by combining the plurality of types of circuit blocks. Therefore, when a function change or a design change occurs, the circuit block can be replaced or added in circuit block units, and the cost can be reduced.

DESCRIPTION OF EMBODIMENTS

Figure 1:
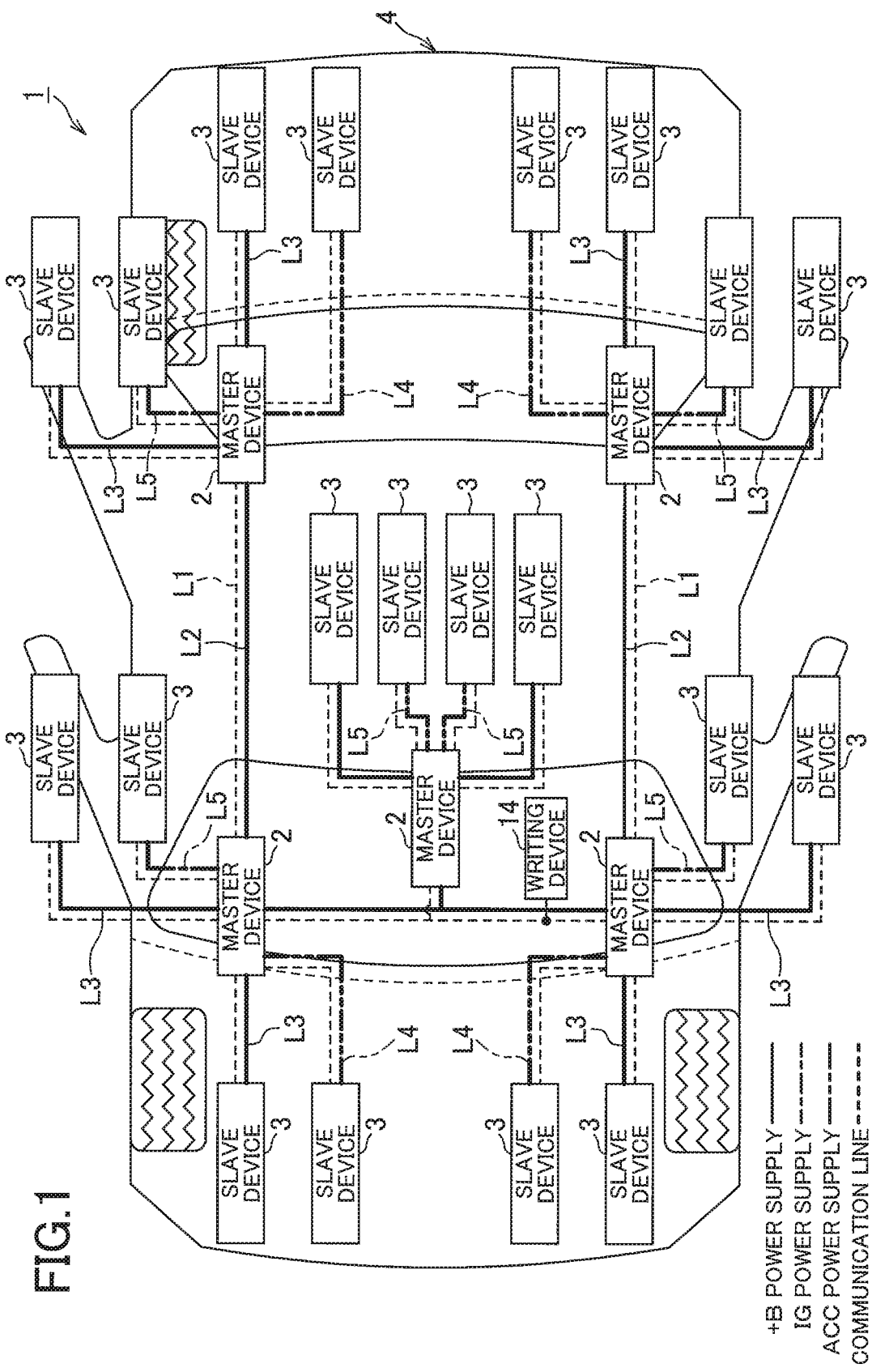
FIG. 1 is a block diagram showing an in-vehicle network as a communication system of the present invention.
Figure 2:
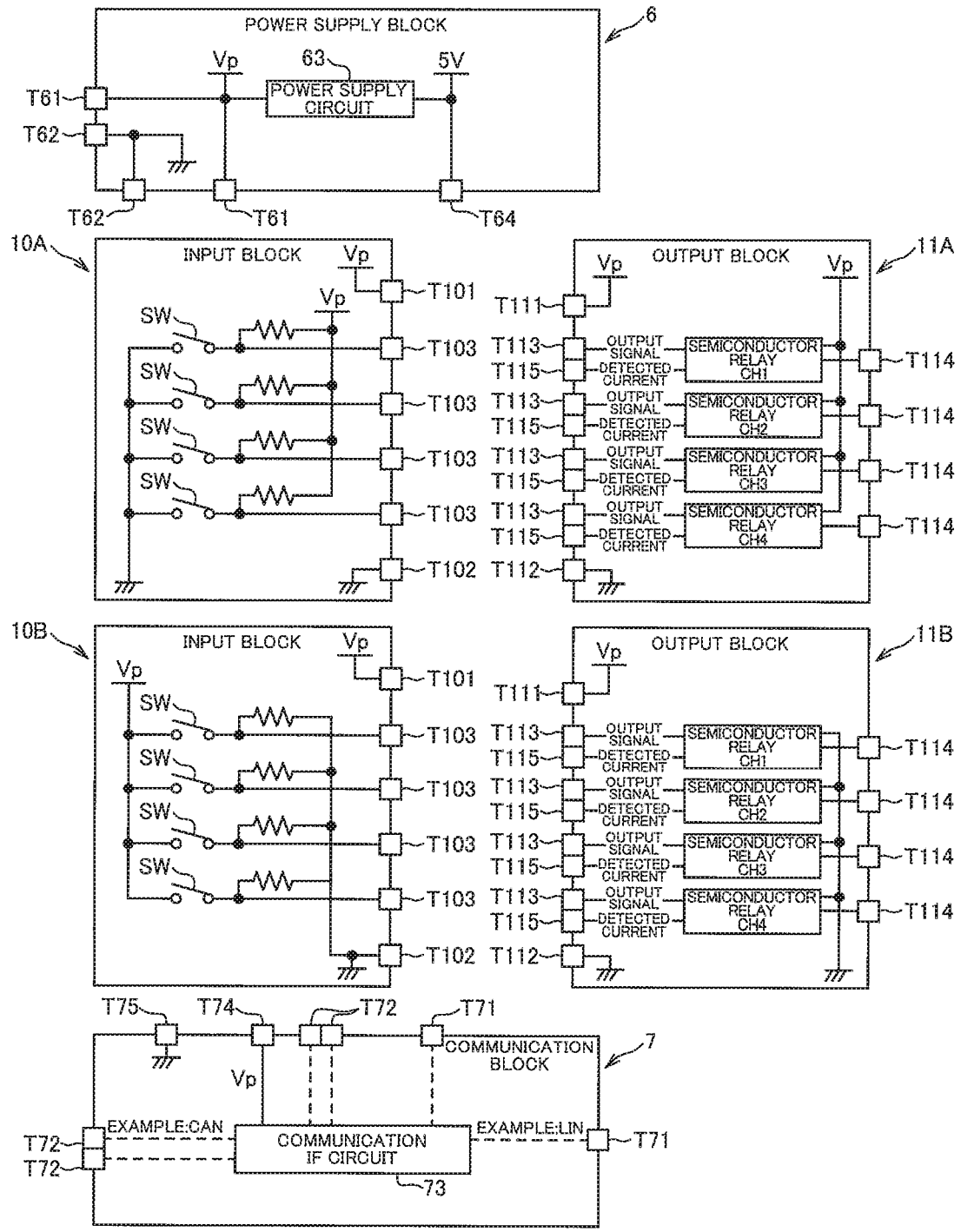
FIG. 2 is a view showing blocks which constitute the in-vehicle network shown in FIG. 1.
Figure 3:
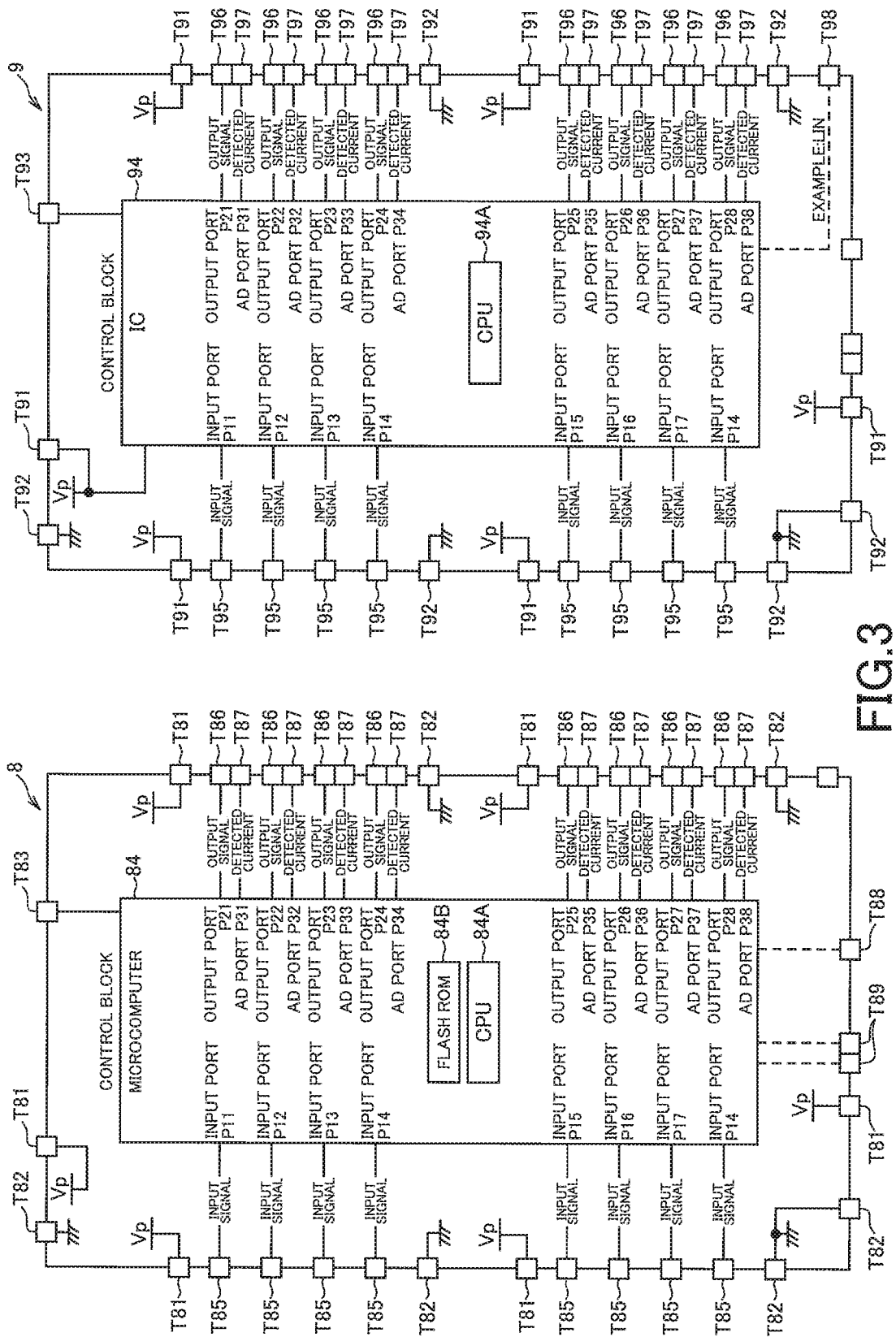
FIG. 3 is a view showing blocks which constitute the in-vehicle network shown in FIG. 1.
Figure 4:
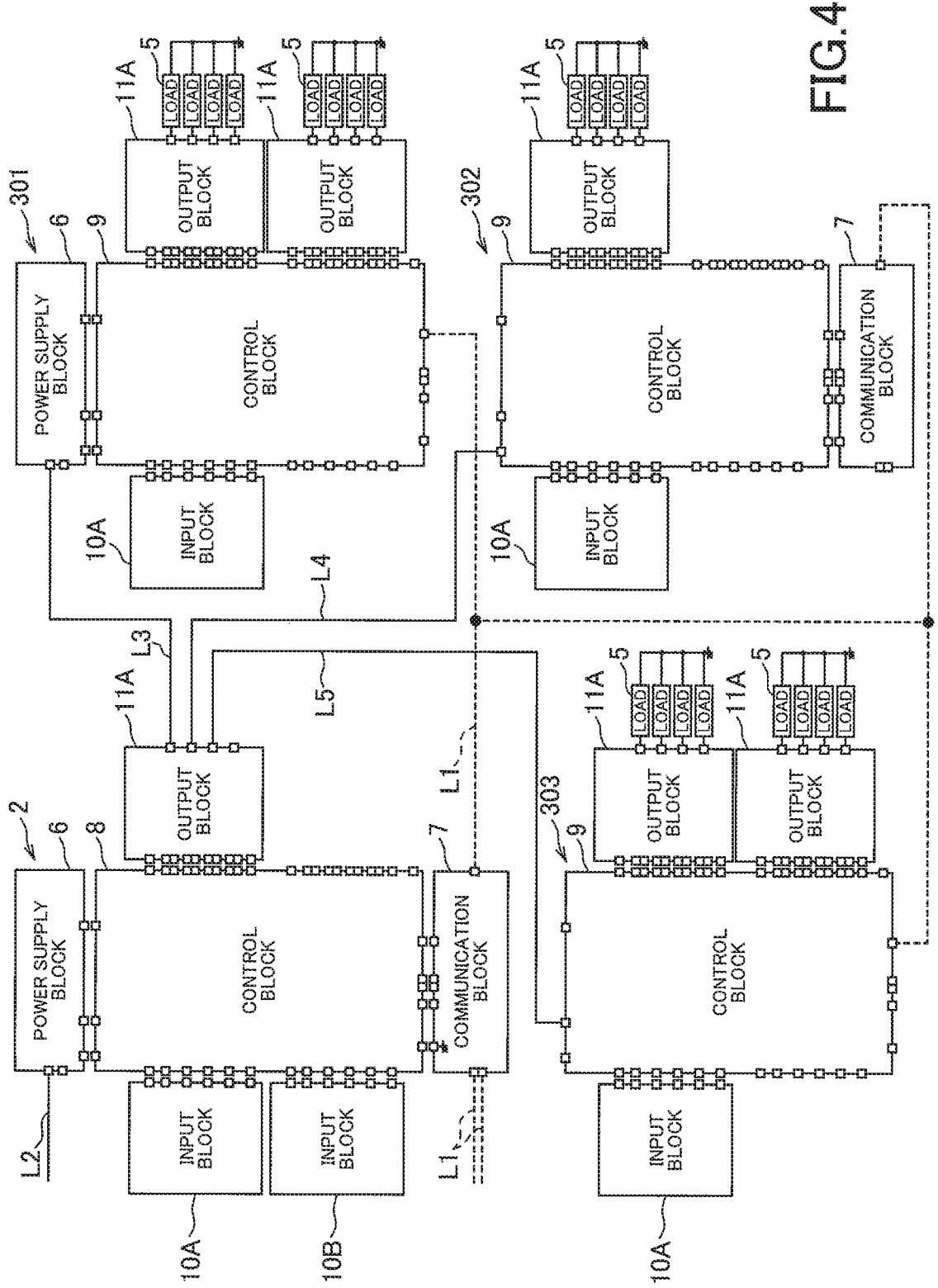
FIG. 4 is a block diagram showing an example of the in-vehicle network shown in FIG. 1 configured by combining the blocks shown in FIG. 2 and FIG. 3.

Hereinafter, an embodiment of the present invention will be described based on FIGS. 1 and 2. FIG. 1 is a block diagram showing an in-vehicle network 1 as a communication system of the present invention. FIGS. 2 and 3 are views showing blocks which constitute the in-vehicle network 1 shown in FIG. 1. FIG. 4 is a block diagram showing an example of the in-vehicle network 1 shown in FIG. 1 configured by combining the blocks shown in FIG. 2 and FIG. 3.

The in-vehicle network 1 shown in FIG. 1 is mounted on a vehicle 4. The in-vehicle network 1 includes a plurality of master devices 2 and a plurality of slave devices 3 (sometimes described as slave devices 301 to 303 as shown in FIG. 4). The plurality of master devices 2 is disposed in each area of the vehicle 4. In this embodiment, the master devices 2 are arranged at five places, that is, front right (FR-RH), front left (FR-LH), front center (FR-CENTER), rear right (RR-RH), rear left (RR-LH) of vehicle 4.

The five master devices 2 are communicably connected to each other by a communication line L1. The master devices 2 are connected to each other by a +B power supply line L2 connected to a battery (not shown), and are supplied with power via the +B power supply line L2.

Further, each of the five master devices 2 is communicably connected to the plurality of slave devices 3 disposed in their own area by the communication line L1. The master device 2 and the slave devices 3 are connected in a one-to-multiple manner. The master device 2 controls the operations of the plurality of slave devices 3 by communicating with the plurality of slave devices 3. The slave device 3 is connected to a plurality of loads 5 (FIG. 4) such as a lamp, a seat motor, and a door motor disposed in its own area, and controls driving of the load 5 according to communication with the master device 2.

The slave devices 3 in respective areas are provided separately for +B connected to the loadable drive 5 at all times, for ACC connected to the loadable drive 5 at the time of accessory, and for IG connected to the loadable drive 5 at ignition.

In the present embodiment, the above-described master device 2 and slave device 3 are respectively configured by combining a power supply block 6, a communication block 7, control blocks 8 and 9, input blocks 10A and 10B, and output blocks 11A and 11B shown in FIGS. 2 and 3. The blocks 6 to 11A and 11B (circuit blocks) are provided on separate substrates, respectively, and can be combined to form various types of in-vehicle networks 1.

The power supply block 6 shown in FIG. 2 is a block that converts a power supply Vp (for example, 12V) to generate a 5V power supply capable of supplying power to control blocks 8 and 9 described later. The substrate of the power supply block 6 is provided with a power supply terminal T61, a ground terminal T62, a power supply circuit 63, and a 5V power supply terminal T64.

The power supply terminal T61 and the ground terminal T62 are terminals connected to the power supply and the ground respectively. The power supply circuit 63 is a circuit that converts the power supply Vp connected to the power supply terminal T61 to generate a predetermined voltage (5V in the present embodiment). The 5V power supply terminal T64 is a terminal connected to the 5V power supply generated by the power supply circuit 63.

A communication block 7 shown in FIG. 2 is a block for performing communication between control blocks 8 and 9 described later. A plurality of communication terminals T71 and T72, a communication IF circuit 73, a power supply terminal T74, and a ground terminal T75 are provided on the substrate of the communication block 7. In the present embodiment, the communication block 7 is provided with two types of a LIN communication terminal T71 and a CAN communication terminal T72. The communication IF circuit 73 is an interface circuit that enables input and output of signals corresponding to various types of communication (in this embodiment, CAN and LIN) from the communication terminals T71 and T72. The power supply terminal T74 and the ground terminal T75 are terminals connected to the power supply and the ground respectively. The power supply Vp and the ground connected to the terminals T74 and T75 are supplied to the communication IF circuit 73.

Control blocks 8 and 9 shown in FIG. 3 are blocks that control the entire control of the master device 2 and the slave devices 3. In the present embodiment, there are two types of control blocks 8 and 9: a microcomputer-control block 8 in which a microcomputer 84 is mounted, and an IC-control block 9 in which an IC 94 is mounted.

The substrate of the microcomputer-control block 8 is provided with a power supply terminal T81, a ground terminal T82, a 5V power supply terminal T83, a microcomputer 84, a plurality of input terminals T85, a plurality of output terminals T86, a plurality of input terminals T87, and communication terminals T88 and T89. The power supply terminal T81, the ground terminal T82, and the 5V power supply terminal T83 are terminals connected to the power supply, the ground, and the 5V power supply respectively. The microcomputer 84 incorporates input ports P11 to P18, output ports P21 to P28, AD ports P31 to P33, PWM output (not shown), timer, communication function, RAM, CPU (central processing unit) 84A, flash ROM (Read Only Memory) 84B etc.

Figure 5:
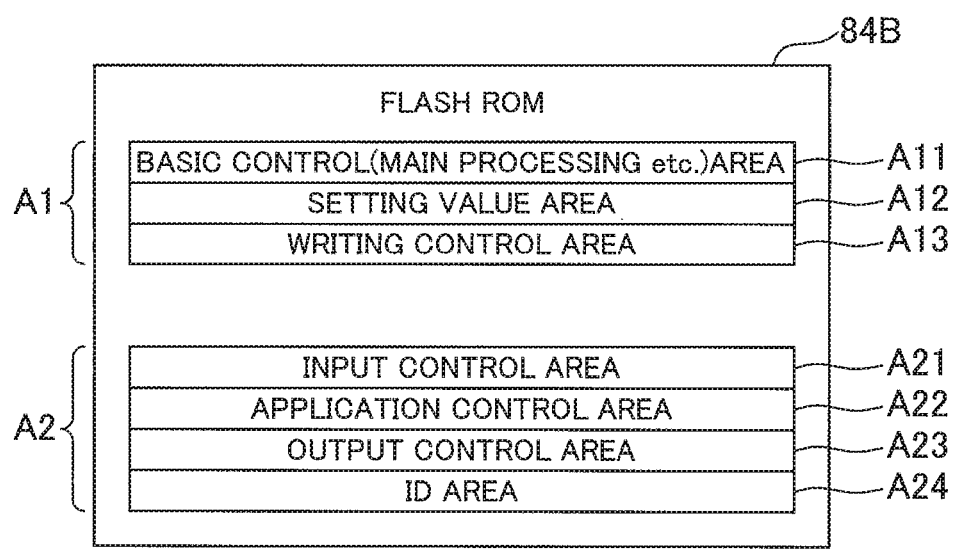
FIG. 5 is a view showing a configuration of a flash ROM of a microcomputer control block shown in FIG. 3.

The CPU 84A controls the entire master device 2 and slave devices 3 and performs various processes in accordance with a processing program. In the flash ROM 84B, as shown in FIG. 5, a non-writing object area A1 not to be written by a writing device 14 described later and a writing object area A2 to be written by the writing device 14 described later are formed.

In the non-writing object area A1, a basic control area A11, a setting value area A12, and a writing control area A13 are formed. In the basic control area A11, settings of functions such as communication and a basic operation program are stored. Various setting values are stored in the setting value area A12. In the writing control area A13, a program for writing in the write object area A2 described later is stored.

In the writing object area A2, an input control area A21, an application control area A22, an output control area A23, and an ID area A24 are formed. The input control area A21 stores a program for determining input based on input signals from the input ports P11 to P18. The application control area A22 stores a program for transmitting an input determination result as input determination data by communication, and a program for determining a load operation based on input determination data received by communication. The output control area A23 stores a program for outputting an output signal from the output ports P21 to P28 based on a load operation determination result. An ID required for communication is stored in the ID area A24.

Further, in the present embodiment, eight input terminals T85 shown in FIG. 3 are provided and connected to input ports P11 to P18 of the microcomputer 84. In the present embodiment, eight output terminals T86 are provided and connected to output ports P21 to P28 of the microcomputer 84. In the present embodiment, eight input terminals T87 are provided and connected to AD ports P31 to P38 of the microcomputer 84. The communication terminals T88 and T89 are terminals for inputting and outputting communication signals, and in the present embodiment, two types of communication terminals T88 for LIN and T89 for CAN are provided.

The IC control block 9 is a block that controls control of the slave device 3. The substrate of the IC control block 9 is provided with a power terminal T91, a ground terminal T92, a 5V power terminal T93, an IC 94, a plurality of input terminals T95, a plurality of output terminals T96, a plurality of input terminals T97, and a communication terminal T98.

The power supply terminal T91, the ground terminal T92, and the 5V power supply terminal T93 are terminals connected to the power supply, the ground, and the 5V power supply respectively. Incidentally, when the power supply function is built in the IC 94 described later, the 5V power supply terminal T93 is not necessary. The IC 94 incorporates input ports P11 to P18, output ports P21 to P28, AD ports P31 to P38 and a CPU 94A. The IC 94 incorporates a well-known CPU 94A, and the presence or absence of the communication function and the power supply function differs depending on the IC used. Therefore, the IC control block 9 may be used alone, or the IC control block 9 and the communication block 7 or the power supply block 6 may be used in combination. The IC 94 is a custom IC or a dedicated IC, and control specifications cannot be written in the IC.

Further, in the present embodiment, eight input terminals T95 are provided, and connected to input ports P11 to P18 of the IC 94. The plurality of output terminals T96 are connected to output ports P21 to P28 of the IC 94. The input terminals T97 are connected to AD ports P31 to P38 of the IC 94. The communication terminal T98 is a terminal for inputting and outputting a communication signal, and in the present embodiment, a communication terminal T98 for LIN is provided.

Input blocks 10A and 10B shown in FIG. 2 are blocks connected to input ports P11 to P18 of the control blocks 8 and 9 for inputting input signals to the input ports P11 to P18. A power supply terminal T101, a ground terminal T102, a plurality of local switches SW, and a plurality of output terminals T103 are formed on substrates of the input blocks 10A and 10B. The power supply terminal T101 and the ground terminal T102 are terminals connected to the power supply and the ground respectively. The plurality of local switches SW is switches for operating the load 5 by the user. In the present embodiment, four local switches SW are provided, which are smaller than the number of input terminals T85 and T95 of the control blocks 8 and 9.

The output terminal T103 is a terminal for outputting the on/off state of the local switch SW, and is provided in the same number as the local switch SW. In this embodiment, as the input blocks 10A and 10B, two types are illustrated of the block 10A in which Low (ground) is output from the output terminal T103 when the local switch SW is turned on, and the block 10B in which High (power supply) is output. Note that the present invention is not limited to this, and the output terminal T103 for outputting High and the output terminal T103 for outputting Low may be mixed.

The output blocks 11A and 11B are connected to the output ports P21 to P28 of the control blocks 8 and 9, respectively, and semiconductor relays CH1 to CH4 (output switches) which are turned on and off according to output signals are formed on each of the output blocks 11A and 11B. A power terminal T111, a ground terminal T112, a plurality of semiconductor relays CH1 to CH4, a plurality of input terminals T113, and a plurality of output terminals T114 and T115 are provided on each substrate of the output blocks 11A and 11B. The power supply terminal T111 and the ground terminal T112 are terminals connected to the power supply and the ground respectively. The plurality of semiconductor relays CH1 to CH4 is formed of, for example, an IPD capable of current detection. Incidentally, the plurality of semiconductor relays CH1 to CH4 is not limited to this, and may be composed of a mechanical relay or a general-purpose MOSFET and a shunt resistor, or may be composed of a sense MOSFET.

The plurality of input terminals T113 is provided in one-to-one correspondence with the semiconductor relays CH1 to CH4, and output signals from the microcomputer 84 and the IC 94 are input to the input terminals T113. The semiconductor relays CH1 to CH4 are turned on and off according to the input output signal. The plurality of output terminals T114 is provided in one-to-one correspondence with the semiconductor relays CH1 to CH4, and the power supply or the ground is output to the output terminals T114 when the corresponding semiconductor relays CH1 to CH4 are turned on. The output terminal T115 is provided in one-to-one correspondence with the semiconductor relays CH1 to CH4, and is a terminal from which the current flowing through the semiconductor relays CH1 to CH4 is output as detection current.

In the present embodiment, two types of output blocks 11A and 11B are exemplified: block 11A in which the power supply is output from output terminal T115, and block 11B in which ground is output when semiconductor relays CH1 to CH4 are turned on.

FIG. 4 is a block diagram showing an example of the in-vehicle network 1 configured by combining the blocks described above. As shown in FIG. 4, the master device 2 includes the power supply block 6, the communication block 7, the microcomputer control block 8, two input blocks 10A and 10B, and the output block 11A.

The semiconductor relays CH1 to CH3 constituting the master device 2 are connected to the +B, ACC, and IG slave devices 301 to 303 via the +B power supply line L3, the ACC power supply line L4, and the IG power supply line L5 respectively. The slave device 3 is not connected to the semiconductor relay CH4. The semiconductor relays CH1 to CH3 are turned on according to the output signal from the microcomputer 84, and supply power from the +B power supply line L2 to the corresponding slave devices 301 to 303 through the +B power supply line L3, the ACC power supply line L4, and the IG power supply line L5 respectively.

The slave device 301 for +B includes the power supply block 6, the IC control block 9, the input block 10A, and the output blocks 11A and 11B. The IC control block 9 used in the slave device 301 incorporates a communication function, and the communication block 7 is not necessary.

The slave device 302 for ACC includes the communication block 7, the IC control block 9, the input block 10A, and the output block 11A. The IC control block 9 incorporates a power supply function, and the power supply block 6 is not necessary.

The slave device 303 for IG includes the IC control block 9, the input block 10A, and the output block 11A. The IC control block 9 incorporates a power supply function and a communication function, and the power supply block 6 and the communication block 7 are not necessary.

The semiconductor relays CH1 to CH4 constituting these slave devices 301 to 303 are connected to the loads 5, are turned on in response to the output signals from the control blocks 8 and 9, and supply power to the loads 5.

Next, bit assignments of signals transmitted and received between the master device 2 and the slave device 3 will be described with reference to Table 1 below.

TABLE 1

| ID | | | | | | | |
|---|---|---|---|---|---|---|---|
| INSTALLATION INFORMATION | | | | TYPE | TRANSMISSION/ RECEPTION | SLAVE INFORMATION | |
| bit7 | bit6 | bit5 | bit4 | bit3 | bit2 | bit1 | bit0 |
| FRONT: 01 REAR: 10 CENTER: 11 | | RIGHT: 01 LEFT: 10 CENTER: 11 | | SLAVE: 0 MASTER: 1 | RECEPTION: 0 TRANSMISSION: 1 | SLAVE: 00 SLAVE: 01 SLAVE: 10 SLEVE: 11 | |

| BYTE1 INPUT JUDGMENT DATA | | | | | | | |
|---|---|---|---|---|---|---|---|
| bit7 | bit6 | bit5 | bit4 | bit3 | bit2 | bit1 | bit0 |
| OUTPUT PORT P28 | OUTPUT PORT P27 | OUTPUT PORT P26 | OUTPUT PORT P25 | OUTPUT PORT P24 | OUTPUT PORT P23 | OUTPUT PORT P22 | OUTPUT PORT P21 |
| ON: 1 OFF: 0 | ON: 1 OFF: 0 | ON: 1 OFF: 0 | ON: 1 OFF: 0 | ON: 1 OFF: 0 | ON: 1 OFF: 0 | ON: 1 OFF: 0 | ON: 1 OFF: 0 |

As shown in Table 1 above, the first bit7 to bit0 represent the IDs of the master devices 2 and the slave devices 3. The ID is information that is assigned to all the master devices 2 and slave devices 3 disposed in the vehicle 4 without duplication. The ID is composed of installation information, type information, transmission/reception information, and slave information.

Bit7 to bit4 are assigned to the installation information. Bit7 to bit6 indicate the installation position in the traveling direction of the vehicle 4; "01" if the installation position of the slave device 3 is on the front side of the vehicle 4; "10" if on the rear side; and "11" if in the center of the traveling direction. Bit5 to bit4 indicate the installation position of the vehicle 4; "01" if the installation position of the slave device 3 is the right side of the vehicle 4; "10" if the left side; and "11" if in the center of the left-right direction.

As type information, bit3 is assigned, and becomes "0" in the case of the slave device 3 and becomes "1" in the case of the master device 2.

As transmission/reception information, bit2 is assigned, and becomes "1" when the slave device 3 transmits to the master device 2 and becomes "0" when the slave device 3 receives data from the master device 2.

As slave information, bit1 to bit0 are assigned. The slave information is information that is allocated without duplication to a plurality of slave devices 3 connected to the same master device 2 (the slave devices 3 connected to different master devices 2 may overlap). Although the slave information is represented by 2 bits in the present embodiment, the number of bits may be increased according to the number of slave devices 3 connected to the master device 2.

BYTE1 of bit7 to bit0 following the ID represents input judgement data after setting the ID. Each of bit7 to bit0 is assigned to a plurality of output ports P21 to P28 respectively. Then, if each bit-n (n is an arbitrary integer of 0 to 7) is "0", it indicates that the semiconductor relays CH1 to CH4 connected to the output port P2 (n+1) assigned to the bit-n are off. If each bit-n is "1", it indicates that the semiconductor relays CH1 to CH4 connected to the output port P2 (n+1) assigned to the bit n are on.

Figure 6:
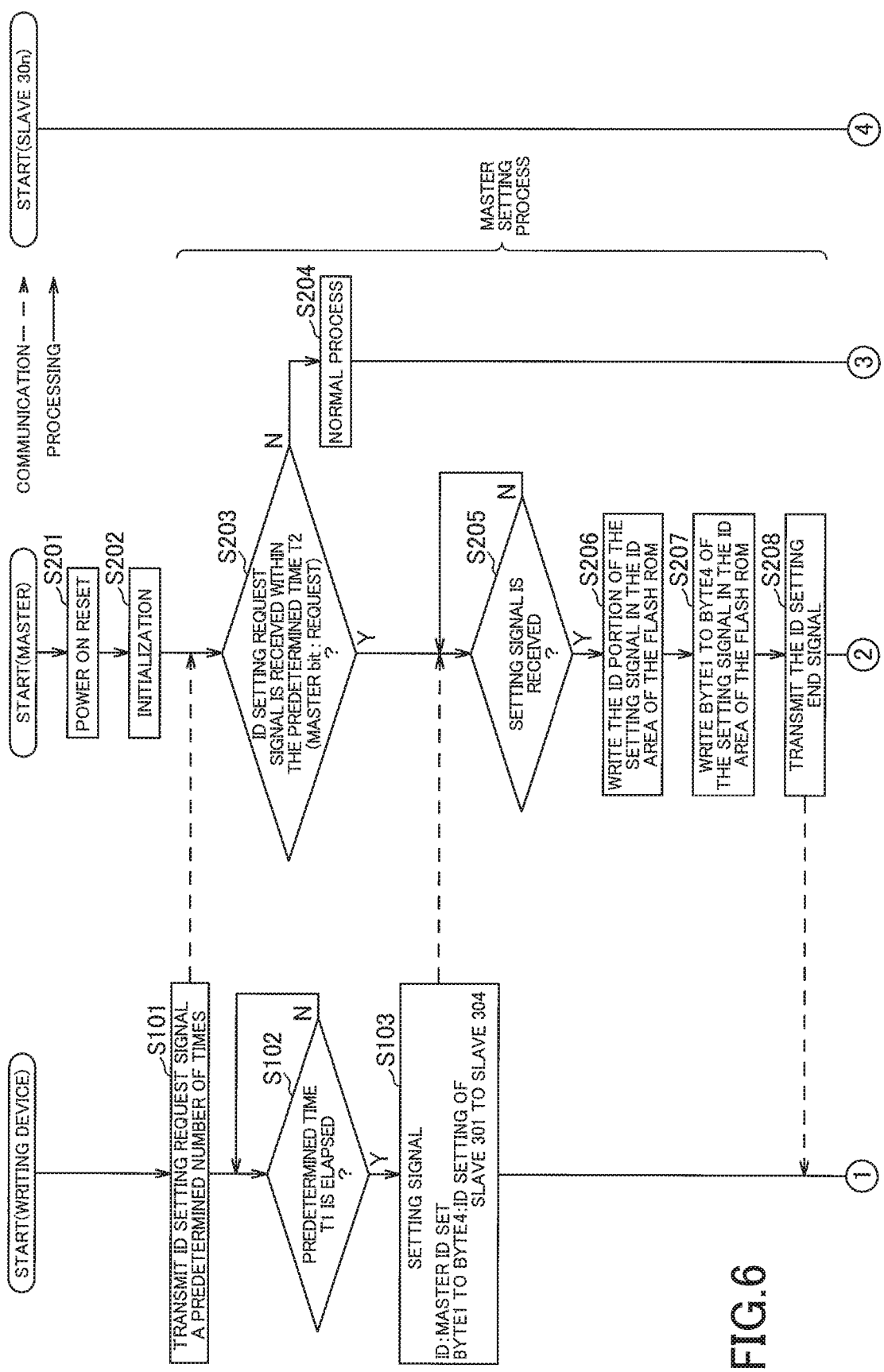
FIG. 6 is flowcharts showing operation processing procedures of a writing device, a master device and a slave device shown in FIG. 1.
Figure 7:
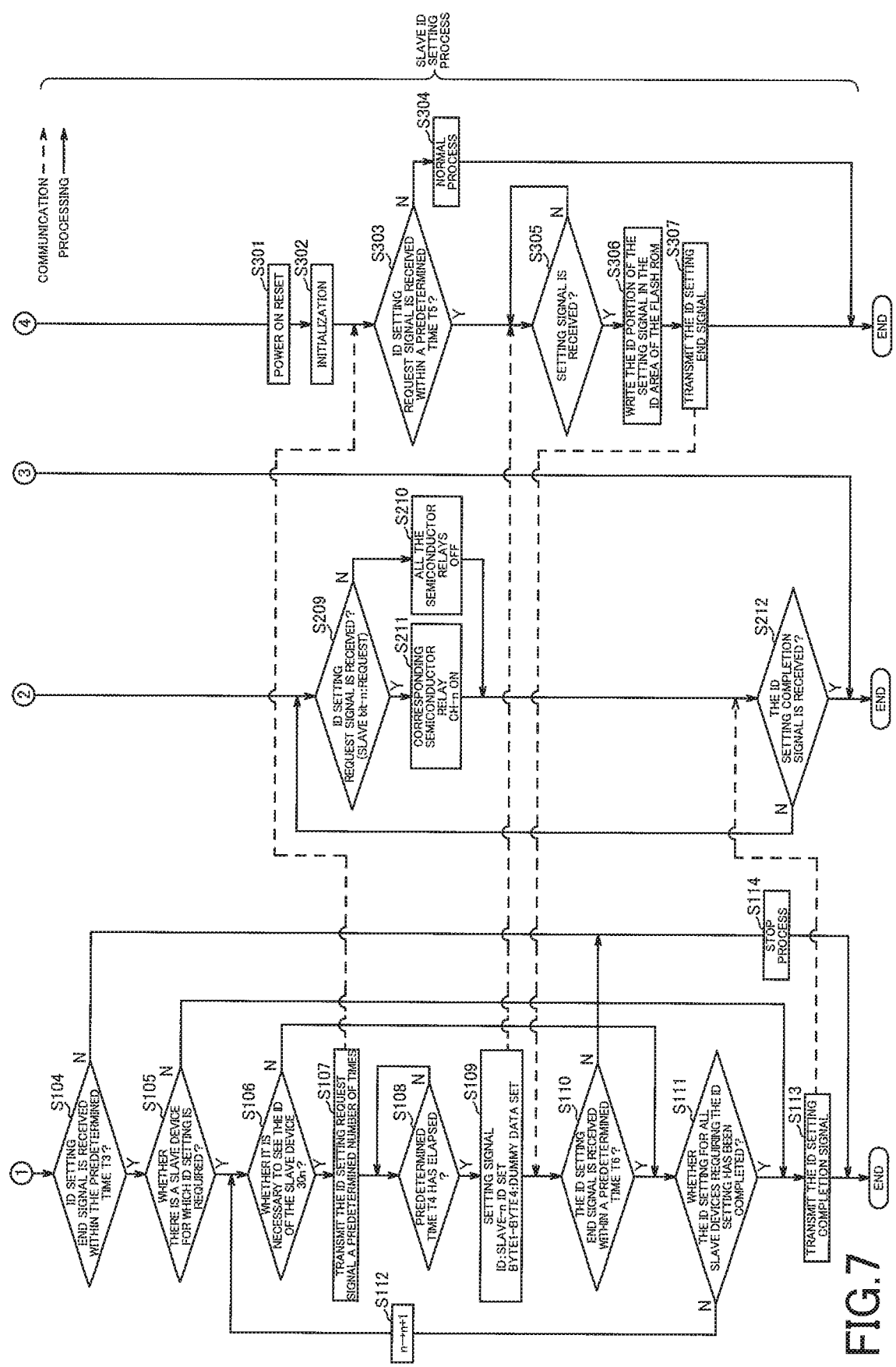
FIG. 7 is flowcharts showing operation processing procedures of a writing device, a master device and a slave device shown in FIG. 1.

Next, the ID setting operation of the in-vehicle network 1 configured as described above will be described with reference to the flowcharts of FIGS. 6 and 7. Incidentally, in the initial state (when ID is not set), the same initial ID (initial reception ID, initial transmission ID) is set in all the microcomputer control blocks 8. Further, since the IC control block 9 confirms the state of an external switch (not shown) and recognizes the ID, it is not necessary to set the ID by the writing device 14.

In the writing device 14, the ID of the master device 2 in each area and the ID of the slave device 3 are set. Further, in the writing device 14, it is set in advance whether each slave device 3 is configured by the microcomputer control block 8 or the IC control block 9.

First, the user connects the writing device 14 (FIG. 1) to the communication line L1. In the writing device 14, the order of the areas where the ID is desired to be set is set. For example, in the example shown in FIG. 1, FR-RH→RR-RH→RR-LH→FR-LH→FR-CENTER, or FR-CENTER→FR-LH→RR-LH→RR-RH→FR-RH according to the connection order of the communication line L1 is set.

After being activated, the writing device 14 executes an ID setting process of the FR-RH area. In the ID setting process, the writing device 14 transmits an ID setting request signal a predetermined number of times (step S101). The bit assignment of the ID setting request signal is shown in Table 2 below.

TABLE 2

| ID | | | | | | | | BYTE1 (ID SETTING REQUEST) | |
|---|---|---|---|---|---|---|---|---|---|
| INSTALLATION INFORMATION | | | | TYPE | TRANSMISSION/ RECEPTION | SLAVE INFORMATION | | MASTER | RESERVE |
| bit7 | bit6 | bit5 | bit4 | bit3 | bit2 | bit01 | bit0 | bit7 | bit6 |
| 0 | 0 | 0 | 0 | 0 | 0 | 0 | 0 | REQUEST: 1 NO REQUEST: 0 | REQUEST: 1 NO REQUEST: 0 |

TABLE 2-continued

| BYTE1 (ID SETTING REQUEST) | | | | | |
|---|---|---|---|---|---|
| RESERVE bit5 | RESERVE bit4 | SLAVE 304 bit3 | SLAVE 303 bit2 | SLAVE 302 bit01 | SLAVE 301 bit0 |
| REQUEST: 1 NO REQUEST: 0 | REQUEST: 1 NO REQUEST: 0 | REQUEST: 1 NO REQUEST: 0 | REQUEST: 1 NO REQUEST: 0 | REQUEST: 1 NO REQUEST: 0 | REQUEST: 1 NO REQUEST: 0 |

As shown in Table 2, in the ID setting request signal, bit7 to bit0 of the ID become "0", and in the following BYTE1, the device that needs ID setting is set. In the present embodiment, bit7 of BYTE1 is assigned to the master device 2. In bit7 of BYTE1, "1" is stored when the ID setting of the master device 2 is requested, and "0" is stored when the ID setting is not requested.

Now, slave devices 3 connected to the output ports P21 to P24 of the master device 2 are referred to as slave devices 301 to 304. Note that in the example shown in FIG. 4, the slave device 304 is not shown. Bit3 to bit0 of BYTE1 are assigned to the slave devices 301 to 304 connected to the output ports P21 to P24 of the master device 2. In bit3 to bit0 of BYTE1, "1" is stored when requesting the ID setting of the slave devices 301 to 304, and "0" is stored when not requesting the ID setting. Also, bit6 to bit4 of BYTE1 are reserves.

In step S101, in order to set the ID of the master device 2, the writing device 14 transmits an ID setting request signal in which only bit7 of BYTE1 is "1" and the other bits bit6 to bit0 are "0".

Thereafter, the writing device 14 waits for a predetermined time T1 to elapse (Y in step S102), and transmits a setting signal indicating the IDs of the master device 2 and slave devices 301 to 304 in the input area (step S103). Table 3 below shows the bit assignment of the setting signal.

TABLE 3

| INSTALLATION INFORMATION | | | | TYPE | TRANSMISSION/ RECEPTION | SLAVE INFORMATION | |
|---|---|---|---|---|---|---|---|
| bit7 | bit6 | bit5 | bit4 | bit3 | bit2 | bit01 | bit0 |
| ID (MASTER ID) | | | | | | | |
| 0 | 1 | 0 | 1 | 1 | 1 | 0 | 0 |
| BYTE1 (SLEVE301 ID) | | | | | | | |
| 0 | 1 | 0 | 1 | 0 | 0 | 0 | 0 | ⇒
| BYTE2 (SLEVE302 ID) | | | | | | | |
| ⇒ 0 | 1 | 0 | 1 | 0 | 0 | 0 | 1 | ⇒
| BYTE3 (SLEVE303 ID) | | | | | | | |
| ⇒ 0 | 1 | 0 | 1 | 0 | 0 | 1 | 0 | ⇒
| BYTE4 (SLEVE304 ID) | | | | | | | |
| ⇒ 0 | 1 | 0 | 1 | 0 | 0 | 1 | 1 |

In the setting signal, one of the transmission ID and the reception ID of the master device 2 (in the embodiment, the transmission ID) is set in bit7 to bit0 of the ID, and the IDs of the slave devices 301 to 304 connected to the output ports P21 to P24 of the master device 2 are set in the subsequent BYTE1 to BYTE4. That is, if there are four slave devices 3 connected to the master device 2, the first ID and the four BYTEs BYTE1 to BYTE4 are sequentially transmitted as setting signals. Note that in the example shown in FIG. 3, since there are three slave devices 301 to 303 connected to the master device 2, unlike Table 3, the BYTE4 corresponding to the slave device 304 is set to an initial value "0".

In the example shown in Table 3, "0101" indicating the front and the right is set to bit7 to bit4 of the ID. Further, "1" indicating the master device 2 is stored in bit3 of the ID. Further, "1" indicating that it is a transmission ID is stored in bit2 of the ID. Also, "0" is stored in bit1 to bit0. Further, "0101" indicating the front and the right is stored in bits bit7 to bit4 of BYTE1 to BYTE4. Further, "0" indicating the slave device 3 is stored in bit3 of BYTE1 to BYTE4. Different values are stored in bit1 to bit0 of BYTE1 to BYTE4, respectively.

Also, the user activates the master device 2 in the order of the areas where the user wants to set the ID. At first, the master device 2 in the FR-RH area is activated. After activated, the CPU 84A of the master device 2 (hereinafter, also simply referred to as the master device 2) executes the processes shown in FIG. 6, and first performs power-on reset and initialization process (steps S201 and S202).

Then, the master device 2 determines whether or not an ID setting request signal in which the bit7 of the byte allocated to the master device 2 is "1" and the others are "0" within the predetermined time T2 is received or not (step S203). If the ID setting request has not been received (N in step S203), the master device 2 executes the normal process (step S204), and ends the process.

On the other hand, when the master device 2 receives the ID setting request signal (Y in step S203), the master device 2 next determines whether a setting signal has been received or not (step S205).

When the setting signal is received (Y in step S205), the master device 2 writes the ID portion of the setting signal as its own ID in the flash ROM 84B (step S206). At this time, the master device 2 inverts bit2 of the ID and writes both the transmission ID and the reception ID in the flash ROM 84B. Thereby, ID authentication of the master device 2 is performed.

Next, the master device 2 writes BYTE1 to BYTE4 as the IDs of the slave devices 301 to 304 in the flash ROM 84B (step S207). Similarly, the master device 2 inverts bit2 of BYTE and writes both the transmission ID and the reception ID in the flash ROM 84B.

In the example illustrated in FIG. 4, the master device 2 receives the setting signal including the ID and BYTE1 to BYTE4 from the writing device 14, and writes BYTE1 to BYTE3 as the IDs of the slave devices 301 to 303 connected to the output ports P21 to P23 in the flash ROM 84B. Since BYTE4 is the initial value, it is not written.

Thereafter, the master device 2 transmits an ID setting end signal (step S208). After the transmission of the ID setting signal (step S103), if the ID setting end signal cannot be received within the predetermined time T3 (N in step S104 of FIG. 7), the writing device 14 cancels the process (step S114). On the other hand, after transmitting the setting signal (step S103), if the writing device 14 can receive the ID setting end signal within the predetermined time T3 (Y in step S104), the writing device 14 determines whether there is a slave device 3 for which ID setting is required (step S105).

As described above, whether the slave device 3 is configured by the microcomputer control block 8 or the IC control block 9 is input to the writing device 14 by the user in advance. If there is a slave device 3 composed of the microcomputer control block 8 among the slave devices 3 in the area for which an ID is to be set, the writing device 14 determines in step S105 that there is a slave device 3 for which ID setting is required.

As shown in FIG. 4, when all the slave devices 301 to 303 are configured from the IC control block 9, the writing device 14 determines that there is no slave device 3 for which ID setting is required (N in step S105), and the process immediately proceeds to step S113.

On the other hand, when it is determined that there is a slave device 3 for which ID setting is required (Y in step S105), the writing device 14 determines whether it is necessary to set the ID of the slave device 30n (n is an arbitrary integer and is set to 1 in the initial state) connected to the output port P2n of the master device 2 (step S106). If the slave device 30n is configured by the IC control block 9, the writing device 14 determines that the setting of the ID is not necessary (N in step S106), and the process proceeds to step S111.

If the slave device 30n is configured by the microcomputer control block 8, the writing device 14 determines that the setting of the ID is necessary (Y in step S106), and transmits the ID setting request signal a predetermined number of times (Step S107). The ID setting request signal is a signal in which only the bit-n corresponding to the slave device 30n of BYTE1 is set to "1" according to the bit assignment in Table 2 above. After a predetermined time T4 has elapsed (Y in step S108), the writing device 14 transmits a setting signal in which an ID corresponding to the slave device 30n is set and BYTE1 to BYTE4 are set to "0" in the ID area (step S109). Note that the setting signal for the slave device 301 is as shown in Table 4 below.

TABLE 4

| INSTALLATION INFORMATION | | | | TYPE | TRANSMISSION/ RECEPTION | SLAVE INFORMATION | | |
|---|---|---|---|---|---|---|---|---|
| bit7 | bit6 | bit5 | bit4 | bit3 | bit2 | bit01 | bit0 | |
| ID (MASTER ID) | | | | | | | | |
| 0 | 1 | 0 | 1 | 0 | 0 | 0 | 0 | |
| | | | | BYTE1 | | | | |
| 0 | 0 | 0 | 0 | 0 | 0 | 0 | 0 | ⇒ |
| | | | | BYTE2 | | | | |
| ⇒ 0 | 0 | 0 | 0 | 0 | 0 | 0 | 0 | ⇒ |
| | | | | BYTE3 | | | | |
| ⇒ 0 | 0 | 0 | 0 | 0 | 0 | 0 | 0 | ⇒ |
| | | | | BYTE4 | | | | |
| ⇒ 0 | 0 | 0 | 0 | 0 | 0 | 0 | 0 | |

After transmitting the ID setting end signal (step S208 in FIG. 6), if the master device 2 cannot receive the ID setting request signal (N in Step S209 in FIG. 7), after turning off all the semiconductor relays CH1 to CH4 (step S210), the process proceeds to step S212.

When receiving the ID setting request signal (Y in step S209), the master device 2 turns on the semiconductor relay CH-n corresponding to bit-n which is "1" (step S211), and then proceeds to step S212.

As a result, power is supplied to the slave device 30n connected to the semiconductor relay CH-n, and the slave device 30n is activated. After activated, the slave device 30n executes power on reset and initialization process (steps S301 and S302), and determines whether the ID setting request signal has been received within a predetermined time T5 (step S303). If the ID setting request cannot be received within the predetermined time T5 (N in step S303), the slave device 30n executes the normal process (step S304), and ends the process.

On the other hand, if the ID setting request can be received within the predetermined time T5 (Y in step S303), the slave device 30n determines whether the setting signal can be received (step S305). If the slave device 30n can receive the setting signal (Y in step S305), the slave device 30n writes the ID portion of the setting signal as its own ID in the flash ROM 84B (step S306). Then, the slave device 30n transmits an ID setting end signal (step S307), and ends the process.

If the writing device 14 cannot receive the ID setting end signal from the slave device 30n within a predetermined time T6 after transmitting the setting signal (step S109) (N in step S110), the writing device 14 ends the process (step S114). On the other hand, when the writing device 14 receives an ID setting end signal from the slave device 30n within the predetermined time T6 (Y in step S110), the writing device 14 proceeds to step S111.

In step S111, the writing device 14 determines whether or not the ID setting for all slave devices 3 requiring the ID setting has been completed. If the writing device 14 determines that the process has not ended (N in Step S111), the writing device 14 increments n (Step S112), and then returns to step S106 immediately.

On the other hand, when the writing device 14 determines that the process has been completed (Y in step S111), after transmitting the ID setting completion signal (step S113), the writing device 14 ends the process. When the master device 2 receives the ID setting completion signal (Y in step S212), the master device 2 ends the process immediately. On the other hand, if the master device 2 has not received the ID setting completion signal (N in step S212), the process returns to step S209.

After executing the above-described steps S101 to S114 corresponding to the FR-RH area, the writing device 14 sequentially executes the above-described steps S101 to S114 corresponding to the next area. In response to this, the user activates the slave device 3 corresponding to the area. Thereby, the IDs can be set to the master device 2 and the slave devices 3.

According to the above-described embodiment, the master device 2 and the plurality of slave devices 3 are configured by combining plural types of blocks 6 to 11A and 11B. Therefore, when a function change or design change occurs, it can be replaced or added in units of blocks 6 to 11A and 11B, and cost reduction can be achieved.

According to the embodiment described above, the blocks include: control blocks 8 and 9 which control the slave device 3 or the master device 2; input blocks 10A and 10B connected to input ports P11 to P18 of control blocks 8 and 9 for inputting input signals to the input ports P11 to P18; and output blocks 11A and 11B connected to output ports P21 to P28 of control blocks 8 and 9 and having semiconductor relays CH1 to CH4 turned on and off according to output signals.

As a result, when a function change or a design change occurs, cost reduction can be achieved by replacing or adding the control blocks 8 and 9, the input blocks 10A and 10B, and the output blocks 11A and 11B. Further, the number of elements for inputting an input signal and the number of semiconductor relays CH1 to CH4 can be minimized.

Further, according to the embodiment described above, the blocks include the power supply block 6 for supplying power to the control blocks 8 and 9, and the communication block 7 having the communication interface. Thereby, control blocks 8 and 9 which do not have a power supply function or a communication function can also be used, and design assets developed with other products can be diverted.

Also, according to the embodiment described above, the master device 2 receives the ID of the master device 2 from the writing device 14 and sets it as its own ID. Also, after setting the ID of its own, the master device 2 turns on the semiconductor relays CH1 to CH4 in order each time it receives the IDs of the plurality of slave devices 3 from the writing device 14. The plurality of slave devices 3 set the ID received after power supply as their own ID. As a result, since it is not necessary to set the ID every time the slave device 3 is connected (assembled), the setting time of the ID can be shortened and erroneous setting can be reduced.

Further, according to the embodiment described above, the master device 2 is installed in the vehicle 4, and the plurality of slave devices 3 are connected to the plurality of loads 5. The plurality of loads 5 are classified into a load 5 that can be driven at all times, a load 5 that can be driven at the time of an accessory, and a load 5 that can be driven at the time of ignition. Then, the same type of load 5 is connected to one slave device 3. As a result, power can be supplied to the slave device 3 and the setting of the ID can be performed using the semiconductor relays CH1 to CH4 for enabling the load 5 to be driven.

According to the embodiment described above, a plurality of master devices 2 are installed in the vehicle 4, and the ID stored in the flash ROM 24B includes installation information indicating the installation position of the master device 2 in the vehicle 4. As a result, it is possible to easily set different IDs for the slave devices 3 set in the vehicle 4.

Although the input blocks 10A and 10B are configured of the local switches SW according to the above-described embodiment, the present invention is not limited to this. The input blocks 10A and 10B may be any one as long as they can input an input signal to the control blocks 8 and 9, and may be constituted by, for example, a sensor.

Further, according to the above-described embodiment, the slave device 3 and the master device 2 are configured by combining the power supply block 6, the communication block 7, the control blocks 8, 9, the input blocks 10A, 10B, and the output blocks 11A, 11B. However, the present invention is not limited to this. If one having a power supply function and a communication function is used as the control blocks 8 and 9, only the control blocks 8 and 9, the input blocks 10A and 10B, and the output blocks 11A and 11B may be combined.

Further, according to the above-described embodiment, the writing device 14 transmits the IDs of the slave devices 301 to 30n, but the present invention is not limited to this. The master device 2 may sequentially transmit the IDs of the slave devices 301 to 30n.

Note that the present invention is not limited to the above embodiment. That is, various modifications can be made without departing from the scope of the present invention.

REFERENCE SIGNS LIST

1 in-vehicle network (communication system)
2 master device
3, 301 to 303 slave devices
4 vehicle
5 load
6 power supply block (circuit block)
7 communication block (circuit block)
8, 9 control block (circuit block)
10A, 10B input block (circuit block)
11A, 11B output block (circuit block)
14 writing device
84A CPU (first setting unit, switch control unit, second setting unit)
CH1 to CH4 semiconductor relay (output switch)
P11 to P18 input port
P21 to P28 output port

The invention claimed is:

1. A communication system comprising:
a plurality of slave devices;
a master device communicating with the plurality of slave devices; and
a plurality of types of circuit blocks, each with different functions and formed on separate substrates, wherein the slave devices and the master device are respectively configured by combining the plurality of types of circuit blocks, wherein the circuit blocks include:
  a control block for controlling the slave devices or the master device;
  an input block connected to an input port of the control block for inputting an input signal to the input port; and
  an output block having an output switch connected to an output port of the control block and turned on and off according to an output signal, wherein the circuit blocks further include:
  a power supply block for supplying power to the control block; and
  a communication block having a communication interface, the communication system further comprising:
  a writing device for writing an ID to the slave devices and the master device, wherein after transmitting the ID of the master device, the writing device sequentially transmits the IDs of the plurality of slave devices, wherein the master device includes:
  a plurality of output switches provided for each of the plurality of slave devices and for supplying power to the corresponding slave devices;
  a first setting unit that receives the ID of the master device from the writing device and sets it as its own ID; and
  a switch control unit that turns on the output switch in order each time the ID of the plurality of slave devices is received from the writing device after setting its own ID, and wherein the plurality of slave devices has a second setting unit that sets the ID received after power is supplied as its own ID, wherein the master device is installed in a vehicle, wherein the plurality of slave devices is connected to a plurality of loads, wherein the plurality of loads is classified into a load that can be driven at all times, a load that can be driven at accessory time, and a load that can be driven at ignition time, and wherein the same type of load is connected to one of the slave devices, and wherein a plurality of the master devices is installed in a vehicle, and wherein the ID of the master device includes installation information indicating the installation position of the master device in the vehicle.

* * * * *